United States Patent  
Natarajan et al.

(10) Patent No.: US 9,030,354 B2  
(45) Date of Patent: May 12, 2015

(54) IMAGING ARCHITECTURE WITH CODE-DIVISION MULTIPLEXING FOR LARGE APERTURE ARRAYS

(75) Inventors: Arun Natarajan, Corvallis, OR (US); Scott Reynolds, Amawalk, NY (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 13/417,559

(22) Filed: Mar. 12, 2012

(65) Prior Publication Data

US 2013/0234891 A1    Sep. 12, 2013

(51) Int. Cl.  
   *G01S 3/02*     (2006.01)  
   *H04W 88/08*   (2009.01)  
   *H04B 1/50*    (2006.01)

(52) U.S. Cl.  
   CPC ........ *H04W 88/08* (2013.01); *H04B 1/50* (2013.01)

(58) Field of Classification Search  
   CPC ....................................................... G01S 3/02  
   USPC ........................................... 342/351, 357.28  
   See application file for complete search history.

(56) References Cited

U.S. PATENT DOCUMENTS

| | | |
|---|---|---|
| 2005/0092897 A1 | 5/2005 | Schwarte |
| 2007/0040828 A1 | 2/2007 | Zalevsky et al. |
| 2008/0051957 A1 | 2/2008 | Breed et al. |
| 2010/0127916 A1 | 5/2010 | Sakai et al. |
| 2012/0189078 A1* | 7/2012 | Eom et al. ............. 375/295 |

OTHER PUBLICATIONS

John A. Lovberg, et al. "Video-Rate Passive Millimeter-Wave Imaging Using Phased Arrays," Sago Systems Inc. a Subsidiary of Trex Enterprises Corporation, San Diego, California 92121, USA (pp. 1689-1692).

* cited by examiner

*Primary Examiner* — Harry Liu  
(74) *Attorney, Agent, or Firm* — Anne V. Dougherty, Esq.; McGinn IP Law Group, PLLC (57) ABSTRACT

A method and structure for a phased-array system. An orthogonal signal generator generates a plurality of signals $C(i)$ that are orthogonal or near-orthogonal, meaning that a cross correlation between any two signals $C(i)$ is lower than autocorrelation, and there is a plurality of phased-array antenna elements, each said antenna element providing a signal $Sinp(i)$. A multiplier multiplies each signal $C(i)$ with the signal $Sinp(i)$ of a corresponding one of the plurality of phased array antenna elements.

14 Claims, 8 Drawing Sheets

IMAGING ARCHITECTURE WITH CODE-DIVISION MULTIPLEXING FOR LARGE APERTURE ARRAYS

BACKGROUND OF THE INVENTION

1. Field of the Invention

The present invention generally relates to a high-resolution phased-array imager architecture and, more specifically, to a phase array in which the signals in a subset of elements or in all elements are multiplied by orthogonal or near-orthogonal signals.

2. Description of the Related Art

Passive imagers use the microwave and millimeter wave blackbody signals emitted from objects to form an image of a scene. In such imagers, the "angular resolution" refers to the ability to distinguish between objects that are separated by small angular distances.

In the case of a focal plane array, the angular resolution is proportional to the aperture size of the lens that is placed in front of the focal plane array. For example, in the case of a focal plane array shown in FIG. 1, the angular resolution is determined by the diameter of the lens. In such arrays, such angular resolution requires increased lens diameter and, furthermore, the lens has to be moved further from the focal plane array.

There are applications where high angular resolution is needed for imaging. For example, DARPA (Defense Advanced Research Projects Agency) is considering a Sandblaster imager with a 1 milli-radian resolution. The Sandblaster program is directed to permitting helicopter pilots to maintain vision in "brownout" conditions that force the pilot to attempt to land blind or unable to land at all, such as might occur under a helicopter's rotors especially in sandy or dusty areas.

It is noted that resolution $\sim \lambda/D$, where $\lambda$ is wavelength and D is aperture. However, as $\lambda$ is reduced or frequency is increased, the circuits become more difficult to implement, and increasing D also means that the physical size of the system increases. Still, given that one is limited by device performance, a higher D is attractive.

Figure 1:
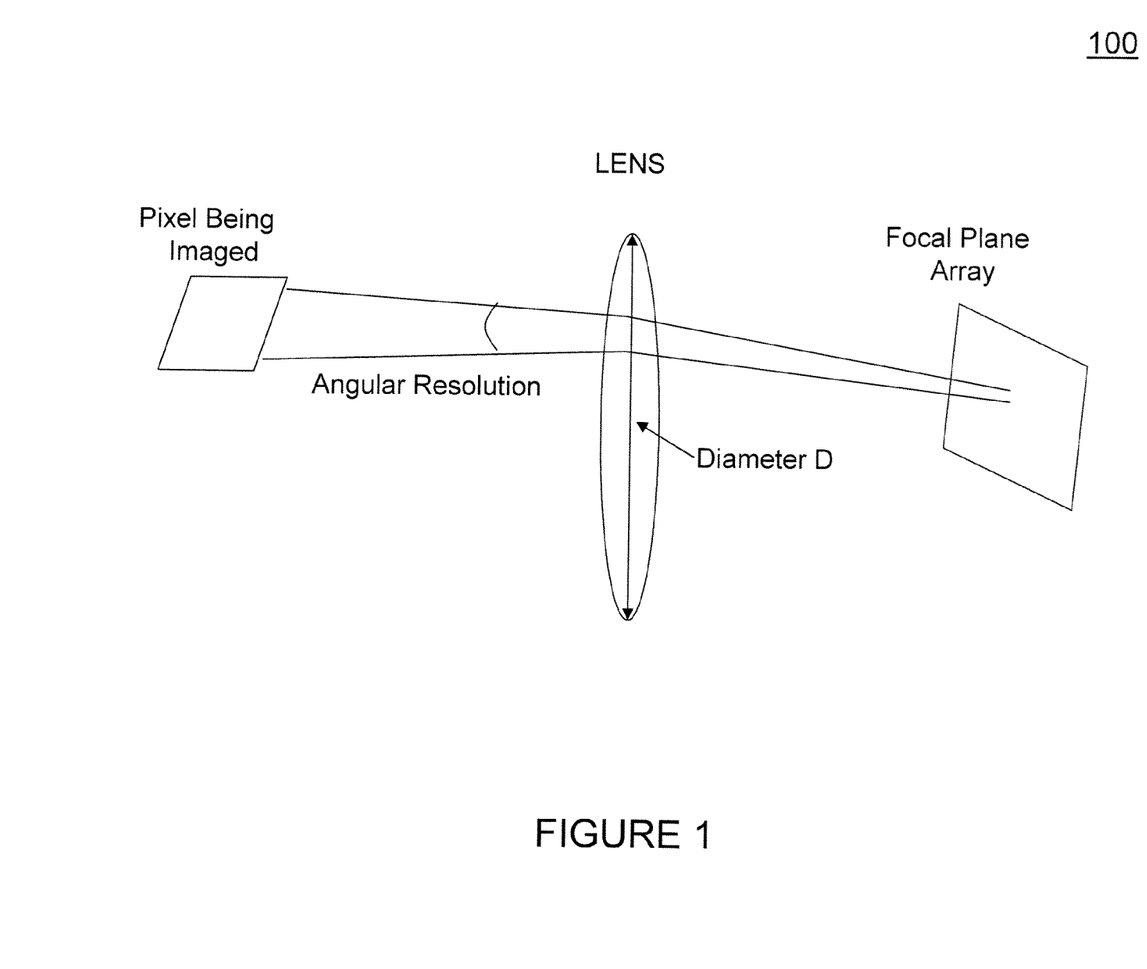
FIG. 1 exemplarily shows how angular resolution in a focal plane array is limited by the size of a lens.

If a big lens (size $\sim$D) is used to focus the image on a focal plane imager, as exemplarily shown in FIG. 1, then the volume of the system increases. A lens is also difficult to manage and adds weight.

Figure 2:
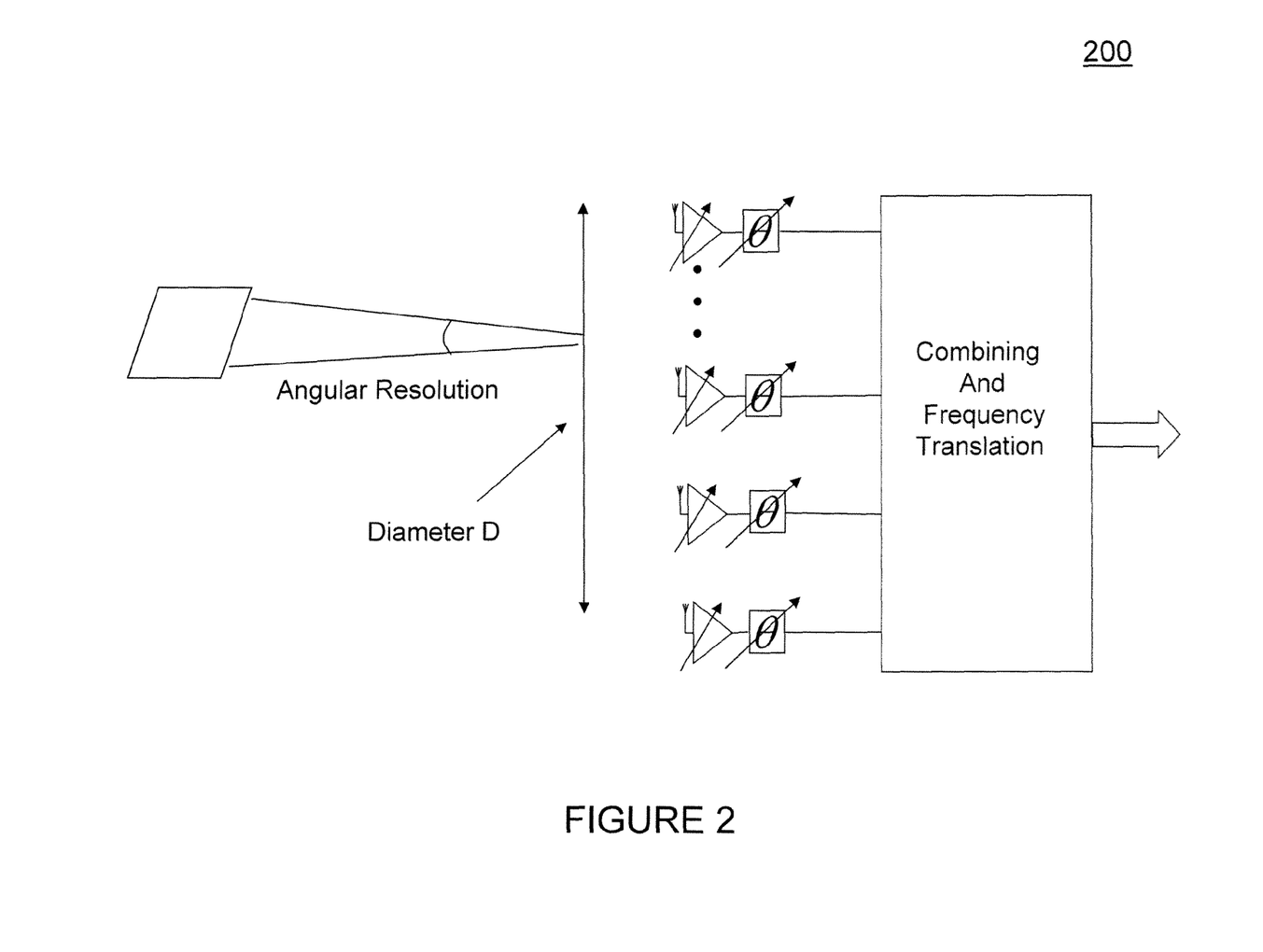
FIG. 2 exemplarily shows how a phased array simplifies imaging by eliminating the need for a lens.

To eliminate the lens, a pupil-plane array can be built, such as a phased-array imager that is capable of beam-steering, as exemplarily shown in FIG. 2. In such an array, different phase and amplitude weights are applied to each element to create beams, using either all array elements or a subset of the elements. The phased array images the scene by steering the beam across the scene and the angular resolution is determined by the width of the beam. The beamwidth depends upon the size of the array (e.g., the largest spacing between any two elements) and the number of elements in the array.

Figure 3:
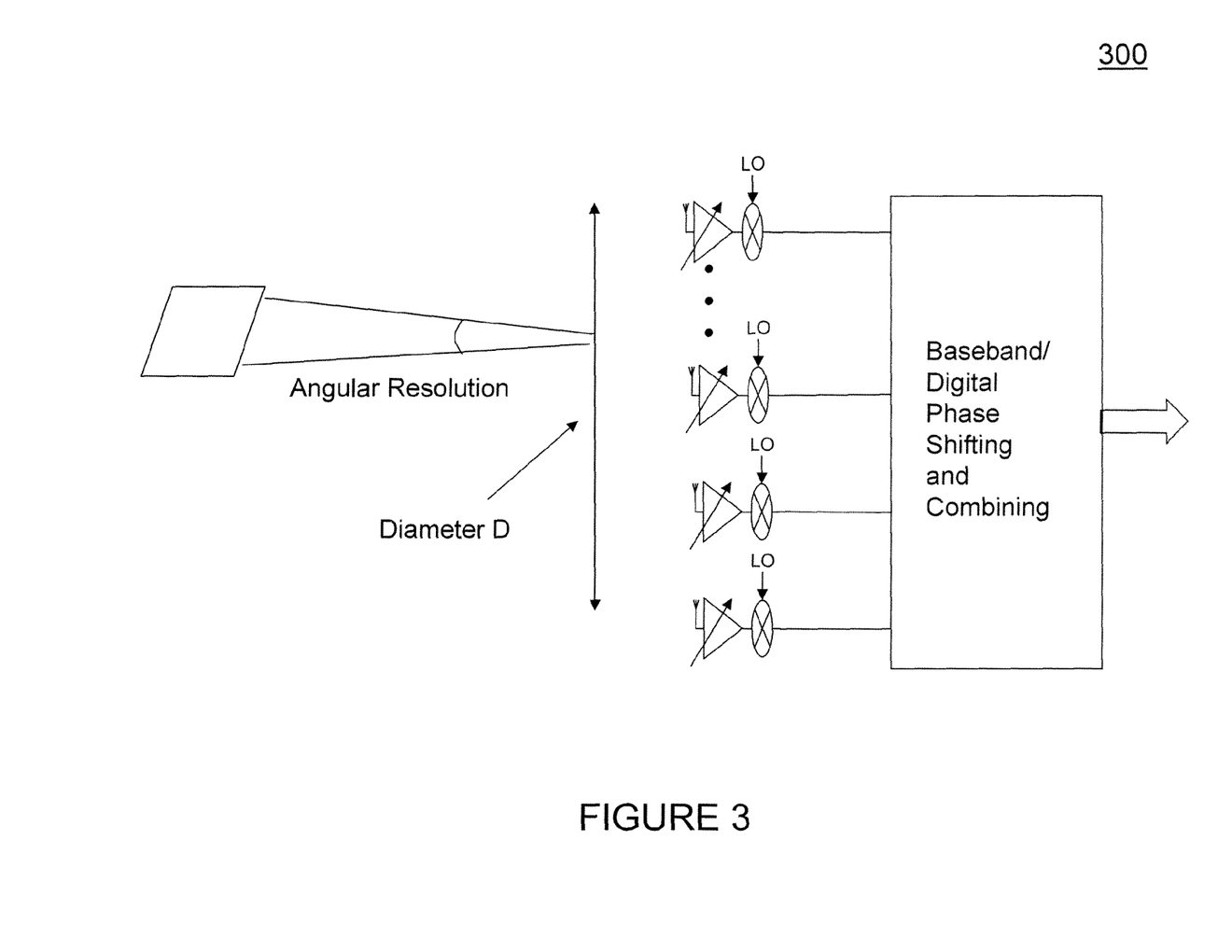
FIG. 3 exemplarily shows a conventional architecture 300 using local oscillators for mixing.

However, the amplitude and phase information at each antenna should be known to construct the image, such as shown in the architecture of FIG. 3, wherein is incorporated digital or baseband beamforming simplifiers for phase shift and variable gain. However, this architecture requires separate mixers in each element, as well as a local oscillator (LO) source for the mixer.

The amplitude and phase of the signal at each antenna in the pupil plane can be gathered through a number of ways. For example, Lovberg, et al., describes a pupil plane array of antenna, amplifiers, and a Rothman lens to do the Fourier transform. A second method is shown in the system 400 shown in FIG. 4, in which N phased array elements provide a pupil plane array whose signals are combined for input into the receiver core.

However, such architectures involve high frequency signal distribution, combining, etc. Coherence must be maintained between the LO signals going into each array chip and the IF signals coming out of each array chip. Maintaining such coherence across chips that are placed in a large aperture is difficult and costly. Moreover, the combining process of FIG. 4 causes information to be lost.

Thus, the present inventors have recognized that a need continues to exist for improved methods to achieve high angular resolution for imaging.

SUMMARY OF THE INVENTION

In view of the foregoing, and other, exemplary problems, drawbacks, and disadvantages of the conventional systems, it is an exemplary feature of the present invention to provide a structure (and method) for a high resolution imager.

It is another feature of the present invention to describe a beam-steering phased-array imager capable of providing high resolution that avoids some of the problems of conventional phased-array imager systems.

It is another feature of the present invention to provide a method for phased-array imagers in which information is not lost when signals of various elements are combined and/or down converted.

It is another feature of the present invention to provide a method in which all information at the input of the phased array elements is preserved for purpose of the beamforming and/or image analysis at baseband. This information preservation is critical particularly in the context of passive imaging where the noise radiated by the scene is not correlated across time. The present invention allows all the information in the scene to be captured and subsequently post-processed, as opposed to phase-shifted and combined phased-array approach where only the information in the direction of the main beam is preserved.

Therefore, in a first exemplary aspect, described herein is a phased-array system including an orthogonal signal generator that generates a plurality of signals $C(i)$ that are orthogonal or near-orthogonal, meaning that a cross correlation between any two signals $C(i)$ is lower than an autocorrelation; a plurality of phased array antenna elements, each said antenna element providing a signal $Sinp(i)$; and a multiplier to multiply each signal $C(i)$ with the signal $Sinp(i)$ of a corresponding one of the plurality of phased array antenna elements.

In a second exemplary aspect, also described herein is a method for imaging, including generating a plurality of signals $C(i)$ that are orthogonal or near-orthogonal, meaning that a cross correlation between any two signals $C(i)$ is lower than an autocorrelation; receiving a passive signal incident on each antenna element in an antenna array; and multiplying a signal of each antenna element by one of the signals $C(i)$.

In a third exemplary aspect, also described herein is a non-transitory, computer-readable storage medium tangibly embodying a program of machine-readable instructions executable by a digital processing apparatus to perform the above-described method of imaging.

The present invention has several advantages over the conventional methods, including the elimination of devices that provide phase and amplitude weights to the signal in each element. The present invention also allows the array to capture the signals from all the elements at one time and permits the measurement of the correlation between signals at different elements.

BRIEF DESCRIPTION OF THE DRAWINGS

The foregoing and other purposes, aspects and advantages will be better understood from the following detailed description of an exemplary embodiment of the invention with reference to the drawings, in which.

AN EXEMPLARY EMBODIMENT OF THE INVENTION

Referring now to the drawings, an exemplary embodiment will now be described, in reference to FIGS. 5-8.

Figure 4:
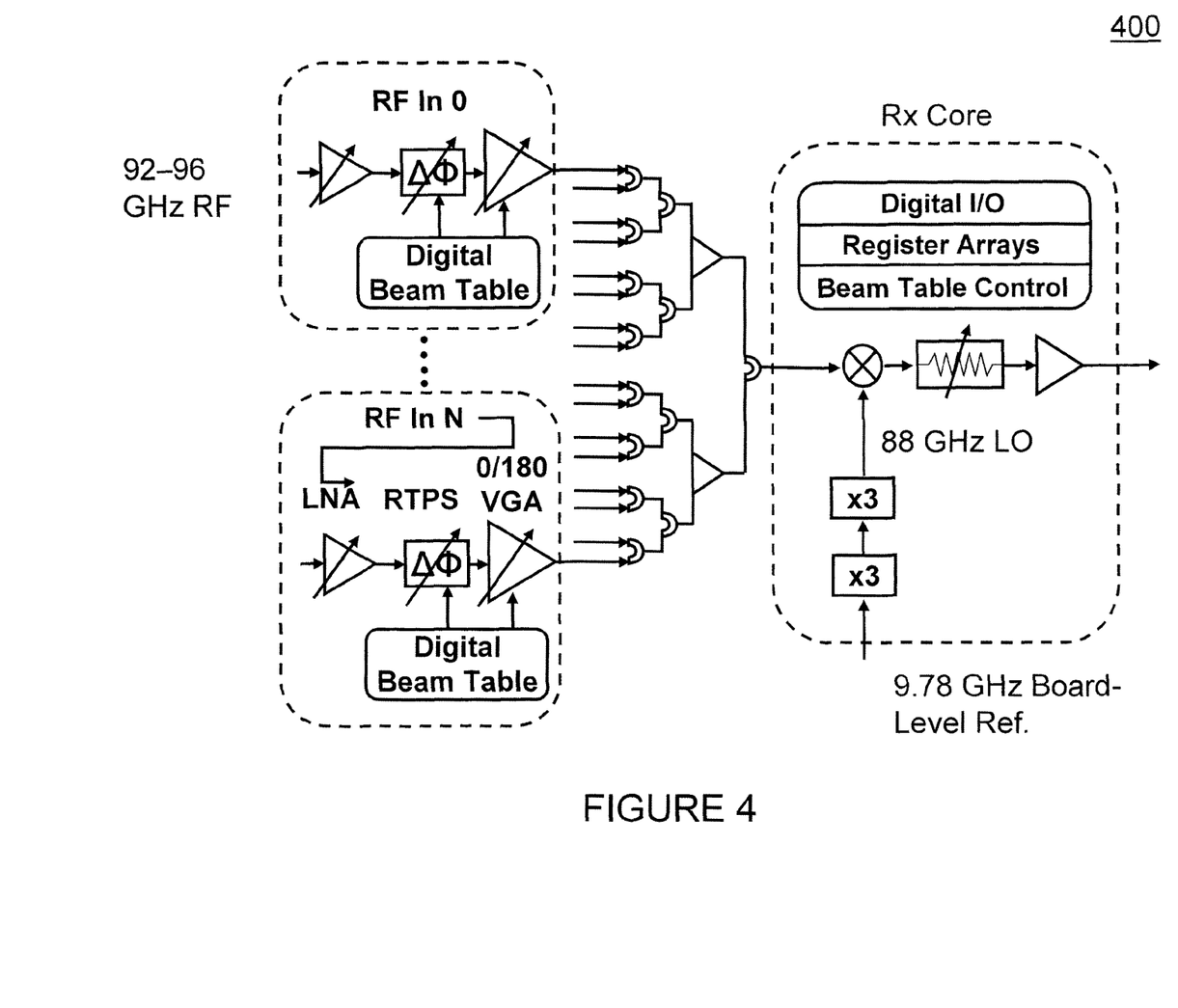
FIG. 4 shows a pupil plane array architecture 400 using phased arrays, as previously developed by the present inventors.

As previously discussed briefly, FIG. 4 shows a conventional architecture of a phased-array imager in which a variable gain and phase shift are applied to the signal in each element before signal combining. However, in such a scheme, broadband phase shifters and variable gain are needed. While it is simpler to implement the gain and phase shift at low frequency in the baseband or in the digital domain, such architecture requires multiple mixers and distribution of frequency references.

Figure 5:
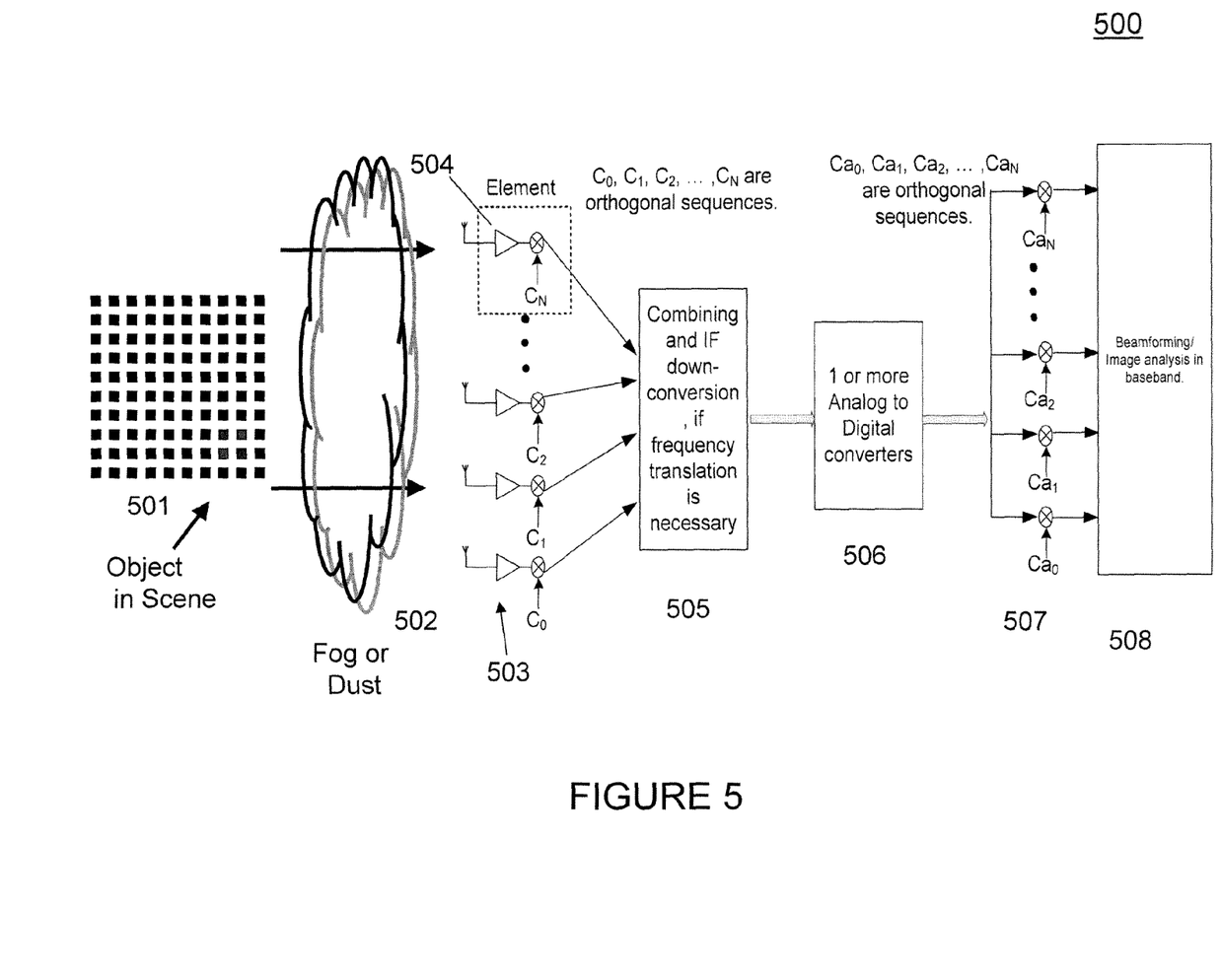
FIG. 5 shows an architecture 500 of an exemplary embodiment of an imager of the present invention.

In contrast to the architecture of FIG. 4, the present invention exemplarily shown in FIG. 5 uses a phased-array imager architecture in which object image 501, as passing through dust or fog 502, arrives at the phased array 503, where it can be amplified, if desired. For each array element $FS_i$ 504, the signal $Sinp_i$ is multiplied by a signal $C_i$. Each $C_i$ signal is chosen such that the signals are orthogonal or close to orthogonal to each other, meaning that the cross correlation between the signals is much lower than the autocorrelation. Signals possessing the properties described above are well known in the art, for example, maximal length, Gold, Barker, Kasami, and Walsh-Sladamarid sequences.

The signal from each element 504 is then combined with the signal from other elements or, alternatively, sent separately to a group of mixers, if frequency translation is necessary. In an N-element imager, there would be 1 to N mixers.

As shown exemplarily in FIG. 5, the multiplied signals from all elements are combined to form signal $$S_{COMB} = \sum_{i=1}^{N} Sinp_i \cdot C_i$$

and sent to a single mixer 505. The output of the mixers could optionally be sampled and digitized by one or more A/D converters 506. The output (possibly digitized) is multiplied by the orthogonal pseudo-noise sequences 507, thereby permitting the signal from each antenna to be recovered.

Thus, after frequency translation, the frequency translated signals from each element FSi can be obtained separately from the frequency translated version of the combined signal FSCOMB, by multiplying FSCOMB by the appropriate signal Cai:

$$FS_i = FS_{COMB} \cdot Cai.$$

This multiplication can be done in digital or analog. It can also be done for a subset of elements in the phased array. The beamforming/fourier transform/image processing is done at baseband 508. Since, the signal from each element is recovered in baseband by multiplying with the orthogonal sequence, it is possible to perform any technique that would otherwise be done amplitude and phase weights in each element, for example, multiple beam formation, formation of sub-arrays, and array tapering to reduce sidelobes.

Figure 6:
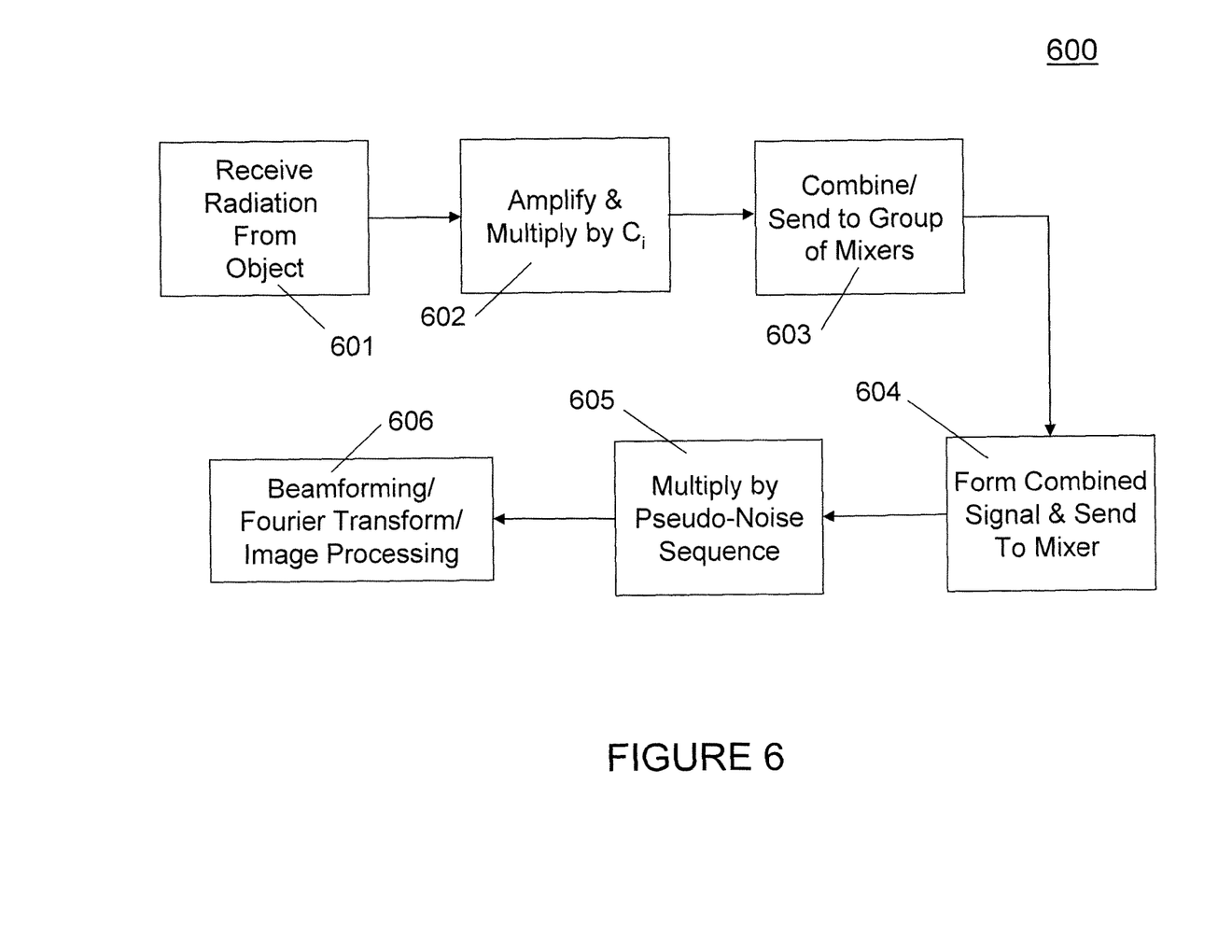
FIG. 6 shows in flowchart format 600 the steps of the method of the present invention.

Thus, as shown in FIG. 6, providing a flowchart format 600 of the method of the present invention, in step 601, a passive signal (i.e. blackbody radiation from objects in the imager's view) is incident on each antenna in the array.

In step 602, this signal is amplified and multiplied by a sequence $C_i$, the components $C_i$ of this sequence being orthogonal to each other. Each of the antenna, amplifier, and the pseudo-noise multiplier are referred to as an "element", and the pupil plane imager can have two or more of such elements.

In step 603, the signal from each element is then combined with the signal from other elements or, alternatively, sent separately to a group of mixers, if frequency translation is necessary. In an N-element imager, there would be 1 to N mixers.

In step 604, the multiplied signals from all elements are combined to form signal $$S_{COMB} = \sum_{i=1}^{N} Sinp_i \cdot C_i$$

and sent to a single mixer. The output of the mixers could optionally be sampled and digitized by one or more A/D converters.

In step 605, the output (possibly digitized) is multiplied by the orthogonal pseudo-noise sequences, permitting the signal from each antenna to be recovered.

In step 606, the beamforming/fourier transform/image processing is done at baseband.

The technique of multiplying signals in each element by orthogonal codes, presents several advantages. Firstly, it eliminates the need for devices that provide phase and amplitude weights to the signal in each element. Secondly, it allows the array to capture the signals from all the elements at one time. The signals can then be post-processed in different ways such as beam formation in different directions, changing the focus of the passive image and sidelobe reduction. Thirdly, such a scheme can also be used to measure the correlation between signals at different elements.

Figure 7:
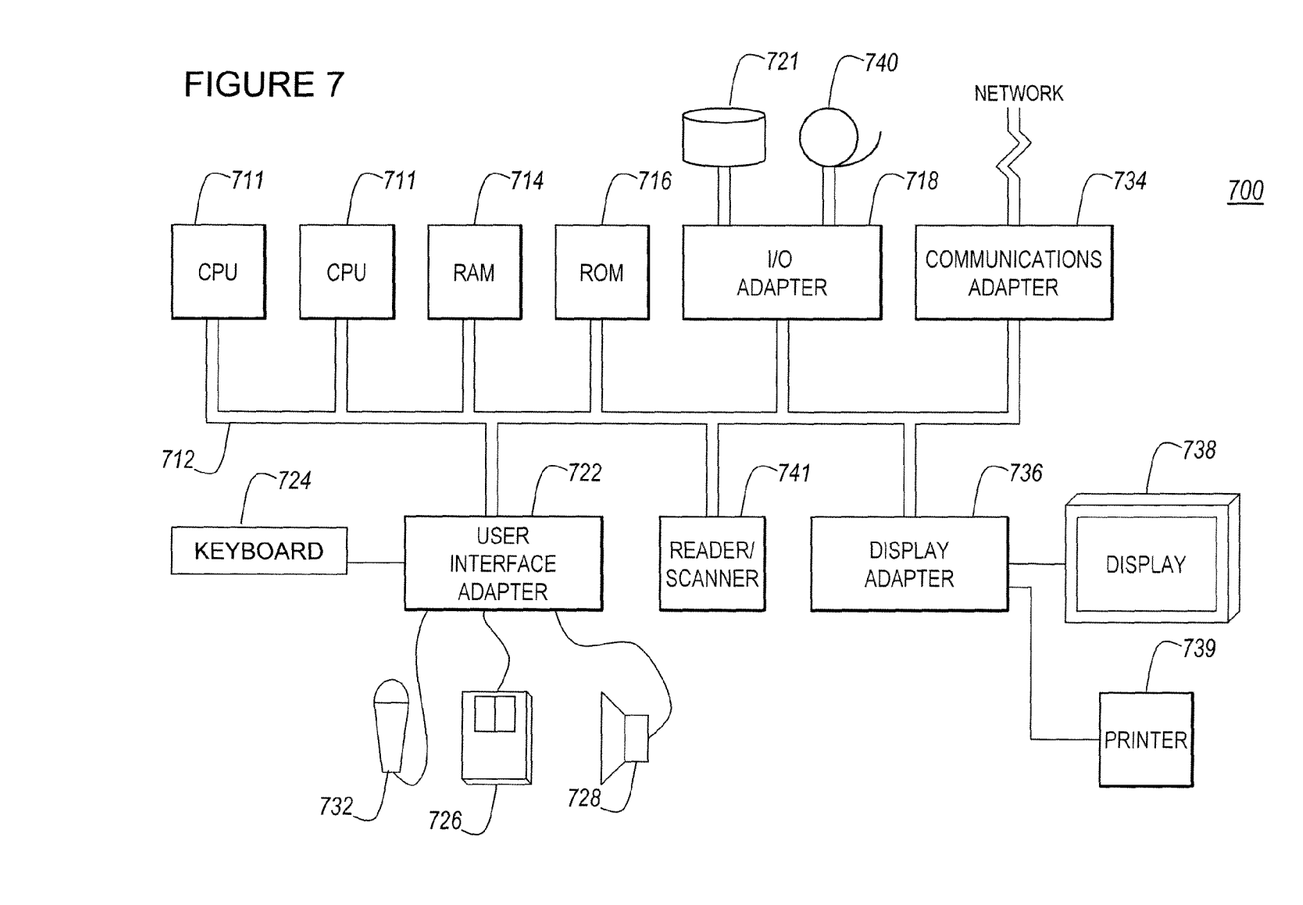
FIG. 7 illustrates an exemplary digital module architecture 700 for implementing digital processing aspects of the present invention.

FIG. 7 illustrates a typical hardware configuration, as based on a typical information handling/computer system, that could be used to implement at least portions of the invention, and which preferably has at least one processor or central processing unit (CPU) 711. In this aspect, the invention is implemented as a system in which portions of this typical computer architecture are incorporated as one or more computer-like modules for execution of processing that are more easily implemented digitally. Thus, the computer-like module(s) could provide the software generation of the orthogonal/near-orthogonal sequence and execute the computations and processing of the image data.

In this aspect, the computer-like modules would typically incorporate one or more CPUs 711 interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), and possibly other interfaces such as a communication adapter 734 for connecting an information handling system to a data processing network, the Internet, an Intranet, a personal area network (PAN), etc., and a display adapter 736 for connecting the bus 712 to a display device 738 and/or printer 739 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer-like module to execute a sequence of machine-readable instructions. These instructions may reside in various types of signal-bearing storage media.

Thus, this aspect of the present invention is directed to a programmed product, comprising signal-bearing storage media tangibly embodying a program of machine-readable instructions executable by a digital data processor incorporating the CPU 711 and hardware above, to perform the method of the invention. In this context, "signal-bearing" describes that the stored instruction has a functional aspect such that an electronic device can sense the instruction information on the signal-bearing storage medium.

This signal-bearing storage media may include, for example, a RAM contained within the CPU 711, as represented by the fast-access storage for example. Alternatively, the instructions may be contained in another signal-bearing storage media, such as a magnetic data storage diskette 800 (FIG. 8), directly or indirectly accessible by the CPU 711, or in a controller PROM accessible by a CPU-like device serving as a controller module.

Figure 8:
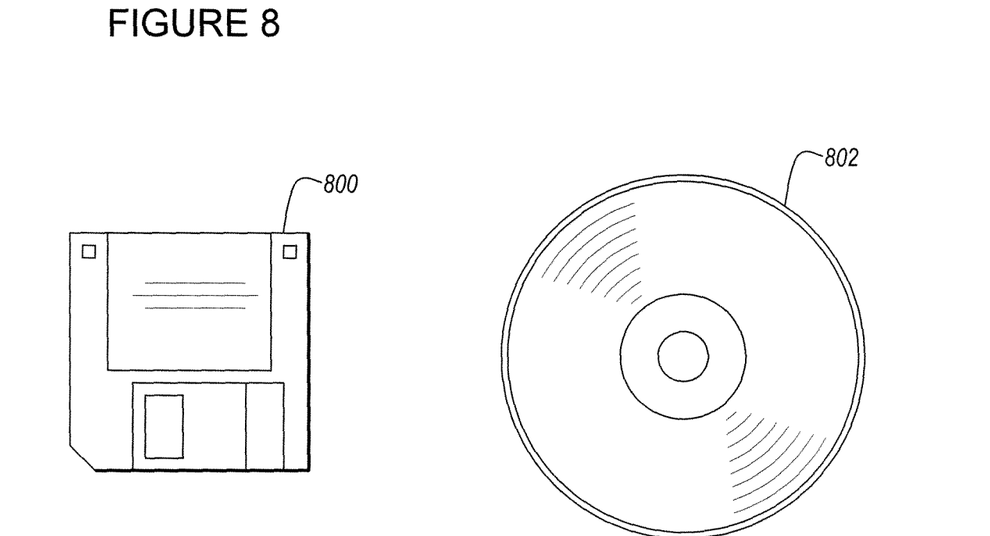
FIG. 8 illustrates a signal bearing storage medium 800 (e.g., storage medium) for storing steps of a program of a method according to the present invention.

Whether contained in the diskette 800, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing storage media including memory devices in transmission hardware, communication links, and wireless, and including different formats such as digital and analog. In an illustrative embodiment of the invention, the machine-readable instructions may comprise software object code.

Although the above paragraphs describe an exemplary configuration in which a discrete computer-like apparatus executes processing such as generation of the orthogonal/near-orthogonal components, multiplication processing, recovery processing, etc., it is noted that an exemplary preferred embodiment would be a phased array, as built in a silicon process technology, which additionally integrates the generation of the code, the multiplication and other processing, etc., as components of the phased array element. In this exemplary embodiment a single module would include both the phased array units as well as processing IC, so that the instructions for processing would be built into the processing IC or ICs as a form of embedded code, such as might be used in a controller module.

While the invention has been described in terms of a single exemplary embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A phased array system, comprising:
an orthogonal signal generator that generates a plurality of signals C(i) that are orthogonal or near-orthogonal, meaning that a cross correlation between any two signals C(i) is lower than an autocorrelation;
a plurality of phased array antenna elements, each said antenna element providing a signal Sinp(i);
a multiplier to multiply each signal C(i) with the signal Sinp(i) of a corresponding one of the plurality of phased array antenna elements;
a combiner to combine all multiplied signals $$S_{COMB} = \sum_{i=1}^{N} Sinp_i \cdot C_i;$$

and
a separator that multiplies the combined signal $S_{COMB}$ by the plurality of signals C(i) to provide data for an image as received by said plurality of phased array elements.

2. The phased array system of claim 1, wherein each element of the phased array antenna comprises a pseudo-noise multiplier for executing the multiplication C(i) x Sinp(i).

3. The phased array system of claim 2, wherein each phased array antenna element further comprises an amplifier that amplifies signal Sinp(i).

4. The phased array system of claim 1, wherein each phased array antenna element receives a blackbody radiation from a scene being observed.

5. The phased array system of claim 1, wherein the separated signals are then combined with complex weights to achieve a beam forming using baseband or digital phase shifting.

6. The phased array system of claim 1, as implemented in an integrated circuit process technology which integrates the generation of the code and processing of received signals into a structure additionally comprising the plurality of phased array antenna elements.

7. A method for imaging, said method comprising:
generating a plurality of signals C(i) that are orthogonal or near-orthogonal, meaning that a cross correlation between any two signals C(i) is lower than an autocorrelation;

receiving a passive signal incident on each antenna element in an antenna array;

multiplying a signal of each antenna element by one of the signals C(i); combining the multiplied signals of the antenna elements to provide a combined sequence $$S_{COMB} = \sum_{i=1}^{N} Sinp_i \cdot C_i;$$

and separating the combined sequence by multiplying the combined signal SCOMB by the plurality of signals C(i) to provide data for an image as received by said plurality of phased array elements.

8. The method of claim 7, wherein each element of the phased array antenna comprises a pseudo-noise multiplier for executing the multiplication C(i) x Sinp(i).

9. The method of claim 7, further comprising amplifying the received passive signal.

10. The method of claim 7, further comprising combining the separated signals with complex weights to achieve a beam forming using a baseband or digital phase shifting.

11. A non-transitory, computer-readable storage medium tangibly embodying a program of machine-readable instructions executable by a digital processing apparatus to perform a method of imaging, said method comprising:

generating a plurality of signals C(i) that are orthogonal or near-orthogonal, meaning that a cross correlation between any two signals C(i) is lower than an autocorrelation;

receiving a passive signal incident on each antenna element in an antenna array;

multiplying a signal of each antenna element by one of the signals C(i);

combining the multiplied signals of the antenna elements to provide a combined sequence $$S_{COMB} = \sum_{i=1}^{N} Sinp_i \cdot C_i;$$

and separating the combined sequence by multiplying the combined signal SCOMB by the plurality of signals C(i) to provide data for an image as received by said plurality of phased array elements.

12. The storage medium of claim 11, wherein each element of the phased array antenna comprises a pseudo-noise multiplier for executing the multiplication C(i) x Sinp(i).

13. The storage medium of claim 11, said method further comprising combining the separated signals with complex weights to achieve a beam forming using a baseband or digital phase shifting.

14. The storage medium of claim 11, as embodied in one of:

a memory device on a computer-like device, as currently executing said method;

a memory device on a computer-like device, as storing said method to be selectively executed upon an input request;

a standalone memory device, as storing said instructions and intended to be inserted into a computer input device to upload said instructions into a memory of a computer-like device; and a memory device of an integrated circuit process technology which integrates the generation of the code and processing of received signals into a structure additionally comprising the plurality of phased array antenna elements.

* * * * *